US008465079B2

(12) United States Patent
Saito et al.

(10) Patent No.: US 8,465,079 B2
(45) Date of Patent: Jun. 18, 2013

(54) COVER COUPLING STRUCTURE

(75) Inventors: Kazunori Saito, Yokohama (JP); Takahiro Yajima, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 0 days.

(21) Appl. No.: 13/357,006

(22) Filed: Jan. 24, 2012

(65) Prior Publication Data

US 2012/0187714 A1 Jul. 26, 2012

(30) Foreign Application Priority Data

Jan. 25, 2011 (JP) ................................ 2011-013292

(51) Int. Cl.
*B60P 7/02* (2006.01)

(52) U.S. Cl.
USPC .................................................... 296/100.16

(58) Field of Classification Search
USPC ........... 296/100.11, 100.16, 35.2, 35.3, 24.4, 296/136.03, 136.07, 136.1
See application file for complete search history.

(56) References Cited

U.S. PATENT DOCUMENTS 4,202,577 A * 5/1980 Breitschwerdt et al. ... 296/24.43
4,277,097 A * 7/1981 Lalanne .................... 296/37.16
4,776,625 A * 10/1988 Lobanoff et al. .......... 296/37.16
5,632,520 A * 5/1997 Butz ......................... 296/24.43
5,685,592 A * 11/1997 Heinz ....................... 296/37.16
5,711,568 A * 1/1998 Diem et al. ................ 296/37.16
6,213,186 B1 * 4/2001 Torres et al. .................... 160/24
6,257,306 B1 * 7/2001 Weldy .......................... 160/327
6,843,518 B2 * 1/2005 Schlecht et al. ........... 296/24.34
8,011,711 B2 * 9/2011 Hirayama et al. ......... 296/24.43
2003/0102691 A1 * 6/2003 Schlecht et al. ......... 296/100.15

FOREIGN PATENT DOCUMENTS

JP 10-166948 A 6/1998
JP 2008-230313 A 10/2008
JP 2009-292395 2/2009

OTHER PUBLICATIONS

Office Action in corresponding Japanese Application No. 2011-013292 dated Dec. 11, 2012.

* cited by examiner

*Primary Examiner* — H Gutman
(74) *Attorney, Agent, or Firm* — Knobbe Martens Olson & Bear LLP

(57) ABSTRACT

There is provided a cover coupling structure including: a coupling groove that is provided to an elongated shaped tonneau cover apparatus including a tonneau cover, the coupling groove including a coupling portion coupled to one end of a sheet-form cover, and an opening portion that is open to the outer peripheral side of the tonneau cover apparatus and is in communication with the coupling portion; an anchor portion provided to the one end of the cover and coupling the one end of the cover to the coupling portion by anchoring to the coupling portion; and a resiliently deformable portion that anchors the anchor portion to the coupling portion, and is set with an external profile dimension along a direction orthogonal to a first face of the cover that is larger than the height dimension of the opening portion when the resiliently deformable portion has been resiliently deformed.

5 Claims, 6 Drawing Sheets

UP
FR
10
20
22
24
32
40
42
46
44
40
46
30
12
16
16
14
18

UP
FR
10
12
14
16
16
18
20
22
24
30
32
40
40
42
44
46
46

COVER COUPLING STRUCTURE

CROSS-REFERENCE TO RELATED APPLICATION

This application is based on and claims priority under 35 USC 119 from Japanese Patent Application No. 2011-013292 filed on Jan. 25, 2011, the disclosure of which is incorporated by reference herein.

BACKGROUND

1. Technical Field

The present invention relates to a cover coupling structure coupling together a sheet-form cover, provided between a vehicle seat and a tonneau cover apparatus, and the tonneau cover apparatus.

2. Related Art

A cover apparatus is provided above a vehicle luggage space in a sub-cover structure of Japanese Patent Application Laid-Open (JP-A) No. 2009-292395. The cover apparatus is equipped with a tonneau cover and a housing section for taking up and housing the tonneau cover. A portion at the vehicle front-side of the housing section is provided with a hook engaging portion, and the hook engaging portion is formed with a groove portion and removal prevention portion.

A sub-cover is provided at the vehicle front direction of the housing section, and the front edge of the sub-cover is attached to an upper portion of a vehicle seatback. One side section of a frame shape frame is supported so as to be able to swing at the rear edge of the sub-cover, and a hook is provided at another side of the frame.

The rear edge of the sub-cover is connected to the cover apparatus by inserting the hook into the groove portion of the hook engaging portion and engaging the hook with the removal prevention portion. The sub-cover is accordingly disposed (deployed) between the cover apparatus and the seatback, and visibility into the luggage room from between the cover apparatus and the seatback is suppressed (blocked) by the sub-cover.

In the sub-cover structure here, configuration is made such that when the sub-cover is pulled out towards the front, the frame swings about an axial line of the one side section, and engagement of the hooks with the hook engaging portion is released. There is therefore the possibility of the sub-cover coming away from the cover apparatus unintentionally.

In order to overcome the problem, as shown in FIG. 6, there is provided a sub-cover structure configured such that the sub-cover does not come away from the cover apparatus even if the sub-cover is pulled. A cover apparatus 100 is provided in this sub-cover structure with a coupling groove 102 open to the outer peripheral side of the cover apparatus 100, and an engaging wall 104 formed at the lower side of the opening portion of the coupling groove 102. A substantially plate shaped hook 108 is attached to the rear edge of a sub-cover 106, and a claw portion 110 formed with a substantially U-shaped cross-section is integrally provided to the leading end of the hook 108. The claw portion 110 opens downwards, and the leading end portion of the claw portion 110 is disposed inside the coupling groove 102, thereby coupling the sub-cover 106 to the cover apparatus 100.

However, in this sub-cover structure too, if the sub-cover 106 is pulled in the direction of the arrow in FIG. 6, the leading end portion of the claw portion 110 is pressed by the engaging wall 104, resiliently deforming the opening claw portion 110 such that the opening dimension of the claw portion 110 is made larger, with the possibility arising of the claw portion 110 passing through the opening portion of the coupling groove 102.

SUMMARY

In consideration of the above circumstances, the present invention is directed towards a cover coupling structure capable of suppressing a cover from coming away from a coupling groove of a tonneau cover apparatus.

The first aspect of the present invention provides a cover coupling structure including:

a coupling groove that is provided to an elongated shaped tonneau cover apparatus including a tonneau cover for covering a vehicle luggage compartment, the coupling groove including a coupling portion coupled to one end of a sheet-form cover provided between a vehicle seat and the tonneau cover apparatus, and an opening portion that is open to the outer peripheral side of the tonneau cover apparatus and is in communication with the coupling portion and is set with a smaller height dimension than the height dimension of the coupling portion;

an anchor portion provided to the one end of the cover and coupling the one end of the cover to the coupling portion by being inserted inside the opening portion and anchoring to the coupling portion; and a resiliently deformable portion that is formed at the anchor portion so as to be resiliently deformable, anchors the anchor portion to the coupling portion by engaging with the coupling portion, and is set with an external profile dimension along a direction orthogonal to a first face of the cover that is larger than the height dimension of the opening portion when the resiliently deformable portion has been resiliently deformed.

In the cover coupling structure of the first aspect of the present invention the coupling groove is provided to the tonneau cover apparatus. The coupling groove includes the opening portion that is open to the outer peripheral side of the tonneau cover apparatus, is in communication with the coupling portion, and the height dimension of the opening portion is set smaller than the height dimension of the coupling portion.

The sheet-form cover is provided between the vehicle seat and the tonneau cover apparatus. The anchor portion is provided to the first end of the cover and is inserted into the opening portion. The anchor portion is provided with the resiliently deformable portion. The resiliently deformable portion anchors the anchor portion to the coupling portion by the resiliently deformable portion engaging with the coupling portion, thereby coupling the first end of the cover to the coupling portion. Visibility to the vehicle luggage compartment from between the rear seat and the tonneau cover apparatus is thereby blocked (suppressed) due to the cover covering the gap between the seat and the tonneau cover apparatus.

The resiliently deformable portion is formed so as to be capable of resilient deformation. The resiliently deformable portion is set with an external profile dimension along a direction orthogonal to a first face of the cover that is larger than the height dimension of the opening portion when the resiliently deformable portion has been resiliently deformed.

Accordingly, even if the resiliently deformable portion resiliently deforms due to pressing force acting from the coupling portion on the resiliently deformable portion when the cover is pulled, the resiliently deformable portion is suppressed from passing through the opening portion of the coupling groove.

Further, even if a certain amount of dimensional error occurs in the resiliently deformable portion, when for example the anchor portion is inserted into the coupling groove along the length direction of the tonneau cover apparatus and the anchor portion is inserted into the opening portion, such dimensional error is absorbed by resilient deformation of the resiliently deformable portion, enabling the anchor portion to be smoothly inserted into the coupling groove.

The second aspect of the present invention provides the cover coupling structure of the first aspect, wherein the resiliently deformable portion is formed by folding back one end portion of the anchor portion such that there is a gap present between the leading end of the resiliently deformable portion and the anchor portion to enable the resiliently deformable portion to resiliently deform.

In the cover coupling structure of the second aspect of the present invention, there is the gap present between the leading end of the resiliently deformable portion and the anchor portion. Accordingly, since the resiliently deformable portion can resiliently deform, the resiliently deformable portion can be made to undertake resilient deformation using a simple structure.

The third aspect of the present invention provides the cover coupling structure of the second aspect, wherein the vertical cross-sectional profile of the resiliently deformable portion is formed in a substantially circular ring shape including the gap.

The fourth aspect of the present invention provides the cover coupling structure of any one of the first through third aspects, wherein the one end of the cover is disposed between the resiliently deformable portion and the coupling portion, and fits into the gap between the resiliently deformable portion and the coupling portion.

In the cover coupling structure of the fourth aspect of the present invention the rattling about of the resiliently deformable portion with respect to the coupling portion can be suppressed due to filling the gap between the resiliently deformable portion and the coupling portion with the cover.

The fifth aspect of the present invention provides the cover coupling structure of any one of the first through fourth aspects, wherein the resiliently deformable portion is engaged with the coupling portion in a resiliently deformed state.

In the cover coupling structure of the fifth aspect of the present invention, rattling about of the resiliently deformable portion with respect to the coupling portion can be efficiently suppressed due to the resiliently deformable portion being engaged with the coupling portion in a resiliently deformed state.

According to the cover coupling structure of the first aspect of the present invention, the cover can be suppressed from coming away from the coupling groove of the tonneau cover apparatus.

According to the cover coupling structure of the second aspect of the present invention, the anchor portion can be formed with a simple structure.

According to the cover coupling structure of the third aspect of the present invention, the ease of forming of the anchor portion can be raised.

According to the cover coupling structure of the fourth aspect of the present invention, noise can be suppressed from emanating from between the resiliently deformable portion and the coupling portion.

According to the cover coupling structure of the fifth aspect of the present invention, noise can be efficiently suppressed from emanating from between the resiliently deformable portion and the coupling portion.

BRIEF DESCRIPTION OF THE DRAWINGS

Exemplary embodiments of the present invention will be described in detail based on the following figures, wherein.

DETAILED DESCRIPTION

Figure 1:
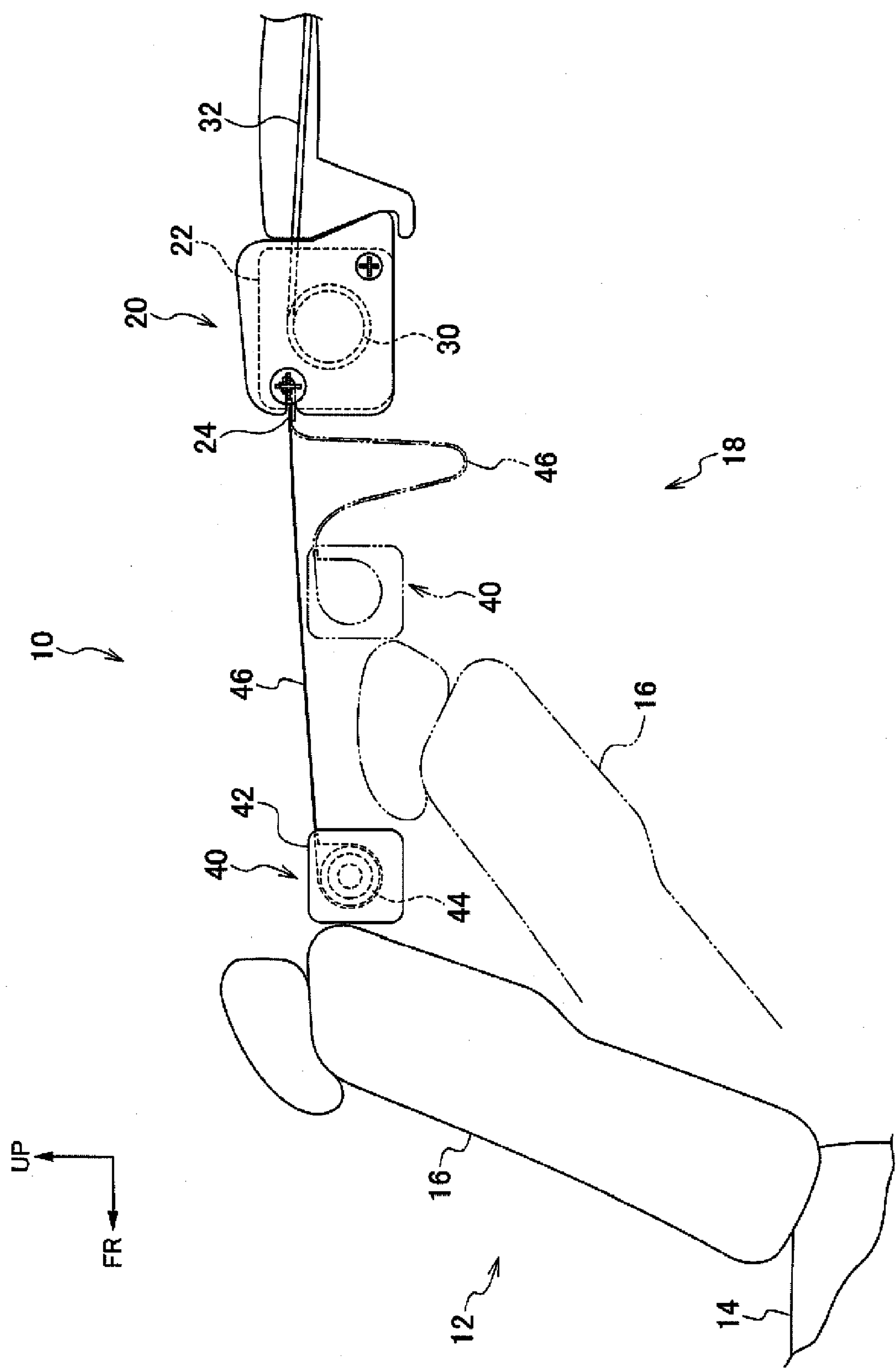
FIG. 1 is a side view of a cover coupling structure according to an exemplary embodiment of the present invention, as viewed from the vehicle right hand side.

FIG. 1 is a side view of a cover coupling structure 10 according to an exemplary embodiment of the present invention, as viewed from the vehicle right hand side. In the drawings arrow FR indicates the vehicle front direction, arrow RH indicates the vehicle right hand side, and arrow UP indicates the upwards direction.

As shown in FIG. 1, a rear seat 12 serving as a seat is disposed at a vehicle rear direction section of a vehicle compartment. The rear seat 12 includes a rear seat cushion 14 for an occupant to sit on, and a rear seat back 16. The rear seat back 16 is disposed in an upright state at a vehicle rear direction edge of the rear seat cushion 14 (a position illustrated in FIG. 1 by the solid lines, referred to below as the initial position). The rear seat back 16 is coupled to the rear seat cushion 14 so as to be able to tilt from the initial position to a position towards the vehicle rear direction (a position illustrated in FIG. 1 by the double-dot broken lines, referred to below as the reclining position).

A vehicle luggage compartment 18 is provided to the vehicle rear direction of the rear seat 12.

An elongated shaped tonneau cover apparatus 20 is provided above the luggage compartment 18 to the vehicle rear direction of the rear seat 12. The tonneau cover apparatus 20 is disposed with its length direction along the vehicle width direction (the vehicle left-right direction), and the two ends of the tonneau cover apparatus 20 are attached to recess portions (not shown in the drawings) provided at the side walls of the vehicle.

The tonneau cover apparatus 20 includes a substantially cylindrical shaped case 22 made from resin. The cross-sectional profile of the case 22 is formed in a substantially rectangular shape with an open portion. A slit (not shown in the drawings) is formed through a portion at the vehicle rear-side of the case 22 for inserting a tonneau cover 32, described later, through.

Figure 2:
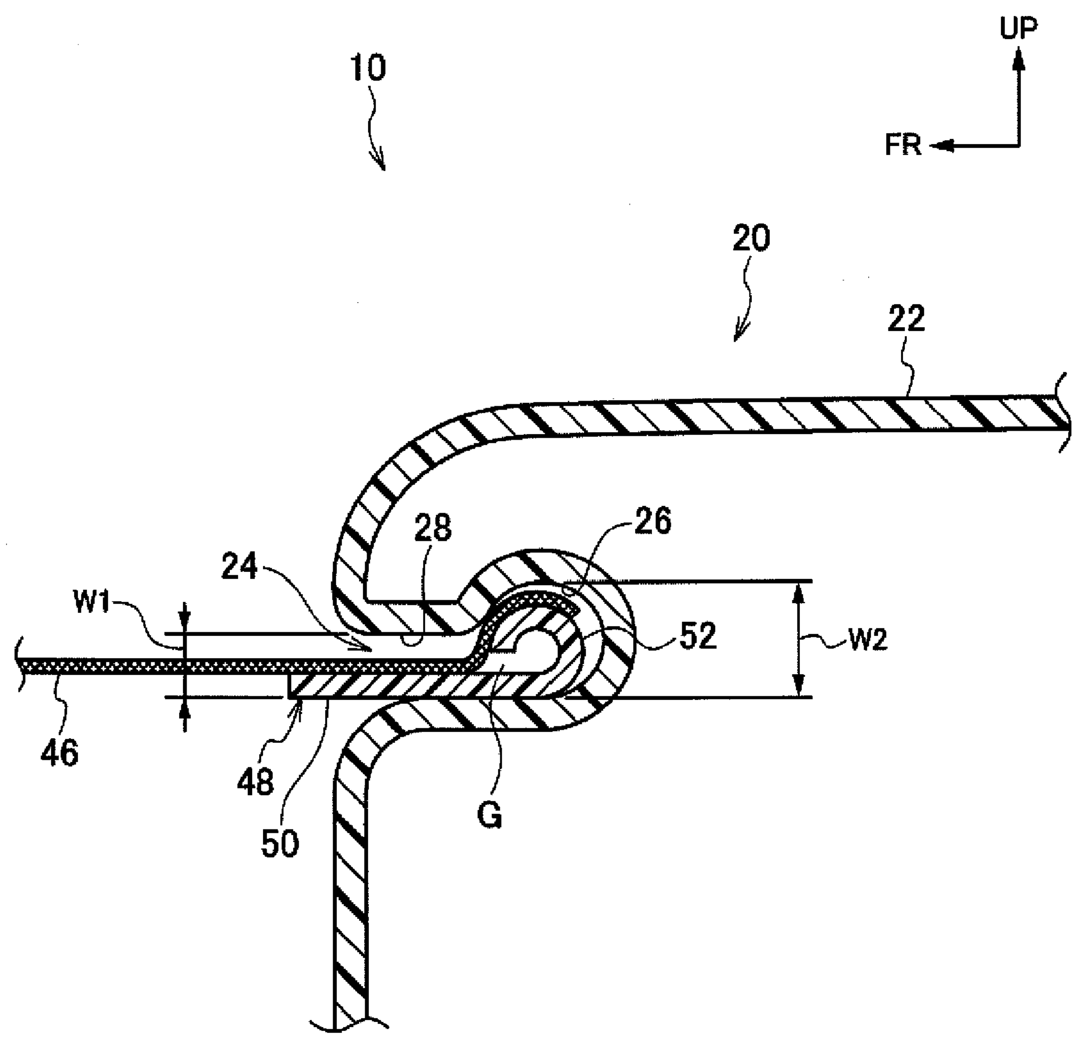
FIG. 2 is a cross-section illustrating a situation in which a claw portion is engaged with a coupling groove employed in the cover coupling structure shown in FIG. 1, as viewed from the vehicle right hand side.

As shown in FIG. 2, a substantially U-shaped cross-section coupling groove 24 is provided at a portion to the vehicle front-side of the case 22. The coupling groove 24 is formed passing through the case 22 along the length direction and open towards the vehicle front direction. An engagement groove portion 26 serving as a coupling portion is provided to a portion at the vehicle rear-side of the coupling groove 24, so as to configure a substantially circular cross-sectional profile in the coupling groove 24. An insertion groove portion 28 serving as an opening portion configuring the coupling groove 24 is provided at a vehicle front-side portion of the coupling groove 24. The insertion groove portion 28 is in communication with the engagement groove portion 26, and is open towards the vehicle front direction. The top face of the insertion groove portion 28 is disposed horizontally, and the bottom and top faces of the insertion groove portion 28 are disposed parallel to each other. A height direction (up-down direction) dimension W1 of the insertion groove portion 28 (the dimension between the top and bottom faces of the insertion groove portion 28) is set smaller than a height direction (up-down direction) dimension W2 of the engagement groove portion 26.

A pair of internal covers, not shown in the drawings, are provided to portions at the two length direction ends of the case 22 shown in FIG. 1, with the internal covers closing off the two ends of the case 22 and the coupling groove 24. A substantially circular cylindrical shaped winding shaft 30 is provided inside the case 22. The two ends of the winding shaft 30 are rotatably supported at the internal covers. A proximal end of the sheet-form tonneau cover 32 is coupled and fixed to the winding shaft 30, and when the winding shaft 30 is rotated in one direction about the axial line (this direction is referred to below as the take-up direction), the tonneau cover 32 is wound up from its proximal end in layers on an outer peripheral portion of the winding shaft 30. On the other hand, when the distal end (the edge on the opposite side to the proximal end) of the tonneau cover 32 is pulled, the tonneau cover 32 is pulled out from the slit in the case 22 while rotating the winding shaft 30 in the other direction about the axial line (this direction is referred to below as the pullout direction). A configuration is accordingly achieved in which the tonneau cover 32 can be made to cover over the luggage compartment 18 by anchoring the distal end of the tonneau cover 32 that has been pulled out from the winding shaft 30 to the vehicle.

A substantially spiral shaped coil spring (not shown in the drawings) is provided inside the winding shaft 30. One end of the coil spring is anchored to the internal cover of the tonneau cover apparatus 20 and the other end of the coil spring is anchored to the winding shaft 30, such that the coil spring biases the winding shaft 30 in the take-up direction.

An elongated shaped front cover apparatus 40 is provided towards the top of the luggage compartment 18 between the rear seat 12 and the tonneau cover apparatus 20. The front cover apparatus 40 is equipped with a substantially circular cylindrical shaped support shaft 44, and both ends of the support shaft 44 are rotatably supported at a pair of substantially square shaped attachment brackets 42. The pair of attachment brackets 42 are configured so as to be capable of attaching and detaching from the side walls of the vehicle at a first position (the position illustrated by the solid line in FIG. 1) and a second position (the position illustrated by the double-dot intermittent line in FIG. 1). In the situation in which the rear seat back 16 is disposed in the initial position, the front cover apparatus 40 is attached at the first position with its length direction along the vehicle width direction. In order to tilt the rear seat back 16 from the initial position towards the vehicle rear-side and dispose the rear seat back 16 in the reclining position, the front cover apparatus 40 is removed from the first position and the front cover apparatus 40 is then attached in the second position.

A proximal end of a sheet-form front cover 46, serving as a cover and made from cloth, is coupled and fixed to the support shaft 44. The front cover 46 extends out from the support shaft 44 towards the vehicle rear direction. The length from the proximal end of the front cover 46 to the distal end (the edge at the opposite side to that of the proximal end) is set at a length enabling the distal end of the front cover 46 to reach the tonneau cover apparatus 20 when the front cover apparatus 40 is attached at the first position.

As shown in FIG. 2, a substantially elongated plate shaped hook 48 serving as an anchor portion and made from resin is provided to the bottom face (first side face) of the front cover 46 at the distal end portion of the front cover 46. The hook 48 is disposed with its length direction along the side of the distal end of the front cover 46. The hook 48 is provided with a substantially plate shaped base 50, and the base 50 is sewn to the bottom face of the front cover 46 such that the hook 48 is attached to the front cover 46.

Figure 4:
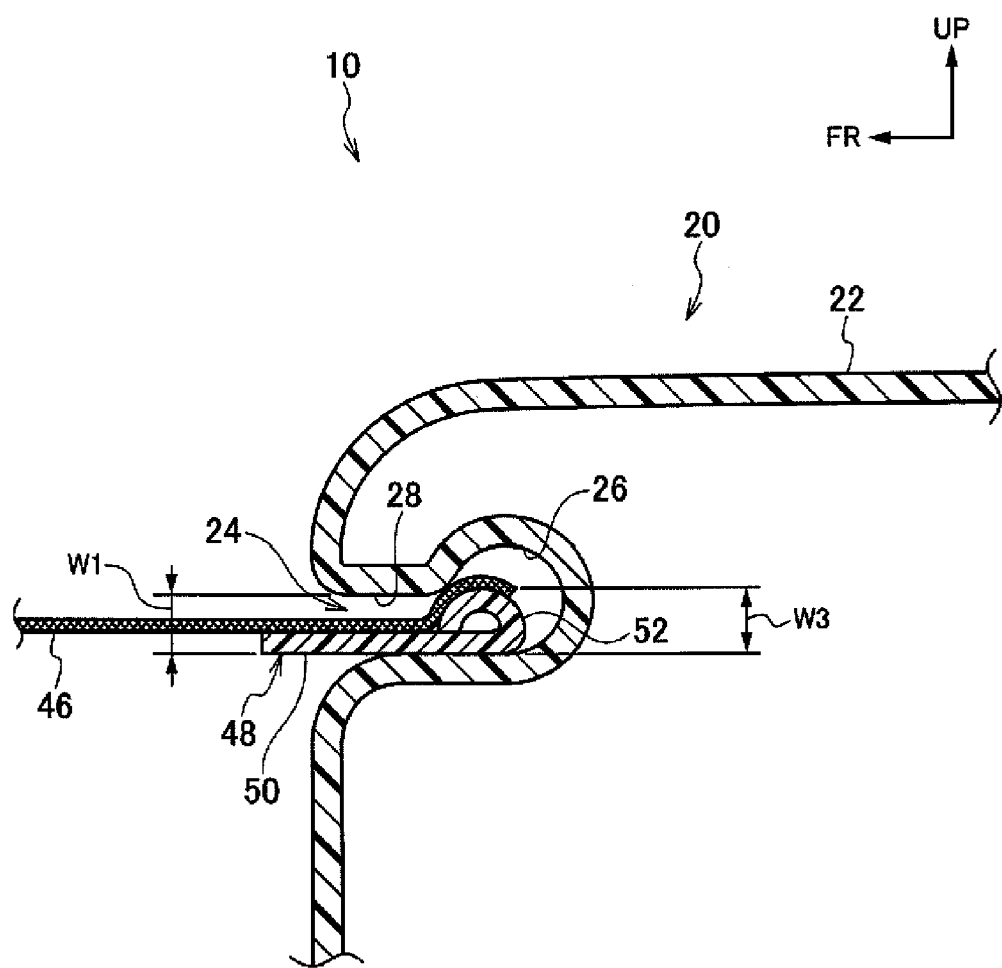
FIG. 4 is a cross-section illustrating a situation in which a front cover employed in the cover coupling structure shown in FIG. 1 is pulled, and the claw portion of a hook has been resiliently deformed, as seen from the vehicle right hand side.

A leading end portion of the base 50 is integrally provided with a claw portion 52 serving as a resiliently deformable portion configuring the hook 48. The claw portion 52 is formed in a substantially circular ring shape with an open portion. A gap G is provided between the leading end of the claw portion 52 and the base 50. The claw portion 52 is accordingly formed so as to be resiliently deformable towards the radial direction inside of the claw portion 52. When the claw portion 52 resiliently deforms in the up-down direction and the leading end of the claw portion 52 makes contact with the base 50, a height direction (up-down direction) dimension W3 of the claw portion 52 (the dimension in a direction perpendicular to the face on the bottom side of the front cover 46) is at its minimum. The height direction dimension W3 of the claw portion 52 is set such that when this occurs (see FIG. 4) the height direction dimension W3 is larger than the height direction dimension W1 of the insertion groove portion 28.

Figure 3:
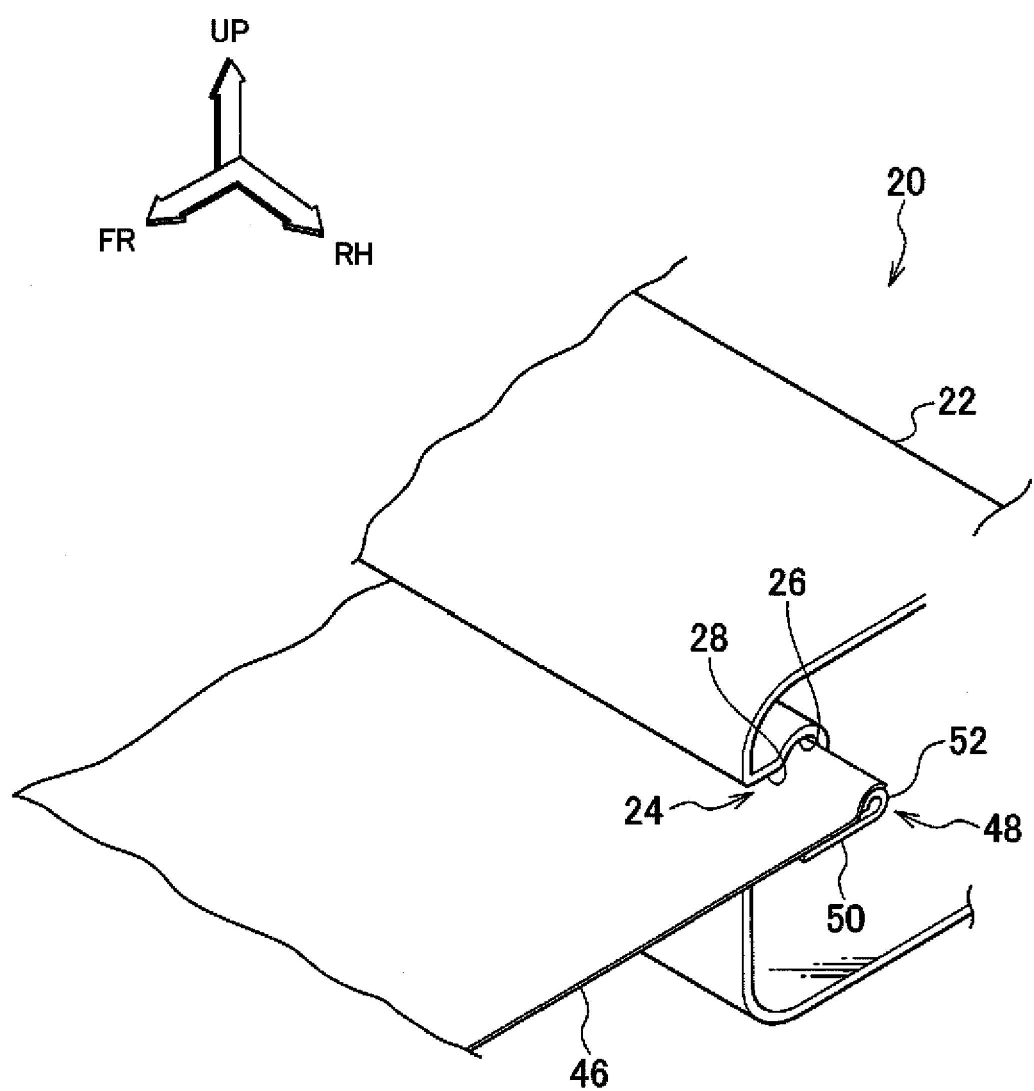
FIG. 3 is a perspective view illustrating when the distal end of a front cover is being inserted into the coupling groove shown in FIG. 2.

The hook 48 is inserted into the coupling groove 24 from the vehicle right hand side of the tonneau cover apparatus 20 along the length direction of the tonneau cover apparatus 20, so as to be inserted inside the insertion groove portion 28 (see FIG. 3). The claw portion 52 is disposed inside the engagement groove portion 26. The distal end portion of the front cover 46 is disposed between the outer peripheral portion of the claw portion 52 and the engagement groove portion 26, and makes contact with the outer peripheral portion of the claw portion 52 and the engagement groove portion 26. The outer peripheral portion of the claw portion 52 is thereby engaged with the engagement groove portion 26 through the front cover 46. Thus, the hook 48 is anchored to the engagement groove portion 26, and the distal end (first end) of the front cover 46 is coupled to the tonneau cover apparatus 20. The front cover 46 is accordingly disposed (deployed) between the rear seat back 16 and the tonneau cover apparatus 20, and visibility to the luggage compartment 18 from between the rear seat back 16 and the tonneau cover apparatus 20 is suppressed (blocked) by the front cover 46.

Explanation follows regarding operation of the present exemplary embodiment.

In the cover coupling structure 10 of the present exemplary embodiment, when the rear seat back 16 is disposed in the initial position, the front cover apparatus 40 is attached to the vehicle at the first position between the rear seat back 16 and the tonneau cover apparatus 20. The proximal end of the front cover 46 is coupled and fixed to the support shaft 44 of the front cover 46, and the hook 48 is provided to the distal end (first end) of the front cover 46. The leading end of the hook 48 is formed with the resiliently deformable claw portion 52.

The hook 48 is inserted into the insertion groove portion 28 of the coupling groove 24 of the tonneau cover apparatus 20, and the outer peripheral portion of the claw portion 52 of the hook 48 is engaged with the engagement groove portion 26 of the coupling groove 24 through the front cover 46. Therefore, the front cover 46 is disposed (deployed) between the rear seat back 16 and the tonneau cover apparatus 20, and visibility to the luggage compartment 18 from between the rear seat back 16 and the tonneau cover apparatus 20 is suppressed (blocked) by the front cover 46.

Further, when the rear seat back 16 is tilted from the initial position to the reclining position, the front cover apparatus 40 is detached from the first position and the front cover apparatus 40 is re-attached at the second position. The front cover 46 is then disposed in a drooping state between the front cover apparatus 40 and the tonneau cover apparatus 20. Accordingly, even when the rear seat back 16 is tilted towards the vehicle rear direction, the tonneau cover apparatus 20 does not interfere with the rear seat back 16, and visibility to the luggage compartment 18 from between the rear seat back 16 and the tonneau cover apparatus 20 is suppressed (blocked) by the front cover 46.

When the front cover 46 is pulled towards the vehicle front direction, the hook 48 provided to the distal end of the front cover 46 attempts to move towards the vehicle front direction. When this occurs, the distal end portion of the front cover 46 makes contact with the boundary portion between the upper face of the insertion groove portion 28 and the engagement groove portion 26, such that pressing force from the coupling groove 24 acts through the front cover 46 on the claw portion 52 of the hook 48.

When the pressing force acts on the claw portion 52, the claw portion 52 deforms in the direction towards the radial direction inside of the claw portion 52 and towards the base 50. When the front cover 46 is pulled further towards the vehicle front direction, the leading end of the claw portion 52 presses against the top face of the base 50. Due to this, resilient deformation of the claw portion 52 is limited.

The height direction (up-down direction) dimension W3 of the claw portion 52 (the dimension in a direction perpendicular to the face on the bottom side of the front cover 46) is set so as to be larger than the height direction dimension W1 of the insertion groove portion 28 when the leading end of the claw portion 52 has made contact with the top face of the base 50. Therefore, the claw portion 52 makes contact with the boundary portion between the top face of the insertion groove portion 28 and the engagement groove portion 26, restricting movement of the claw portion 52 towards the insertion groove portion 28 side. The claw portion 52 is thereby suppressed (prevented) from passing through the insertion groove portion 28. Consequently, the front cover 46 can be suppressed from coming away from the coupling groove 24 of the tonneau cover apparatus 20.

The hook 48 is configured from resin and is formed in an elongated shape. Accordingly, even if, for example, a certain amount of error occurs in the outer peripheral dimension of the claw portion 52 when forming the hook 48 due, for example, to warping, such a dimensional error can be absorbed by resilient deformation of the claw portion 52. More specifically, when the hook 48 is inserted into the coupling groove 24 along the length direction of the tonneau cover apparatus 20, dimensional error in the claw portion 52 is absorbed by the claw portion 52 resiliently deforming, and the claw portion 52 can be inserted without catching on the engagement groove portion 26. Ease of assembly can thereby be raised when assembling the hook 48 to the coupling groove 24 of the tonneau cover apparatus 20.

Furthermore, the gap G is provided between the leading end of the claw portion 52 and the base 50, and the claw portion 52 is made resiliently deformable by the gap G Therefore, the claw portion 52 can be rendered resiliently deformable using a simple structure. The hook 48 can be thereby formed with a simple structure.

The claw portion 52 is formed with a vertical cross-section profile of a substantially circular ring shape including the gap G. The claw portion 52 can accordingly be formed with an easily formed profile. The ease of forming of the hook 48 can hence be raised.

The distal end portion of the front cover 46 is disposed between the outer peripheral portion of the claw portion 52 and the engagement groove portion 26, with the distal end portion of the front cover 46 making contact with the outer peripheral portion of the claw portion 52 and the engagement groove portion 26. The front cover 46 thereby functions as a shock absorbing member, and since rattling about of the claw portion 52 with respect to the engagement groove portion 26 is suppressed, noise can also be suppressed from emanating from between the claw portion 52 and the engagement groove portion 26.

Figure 5:
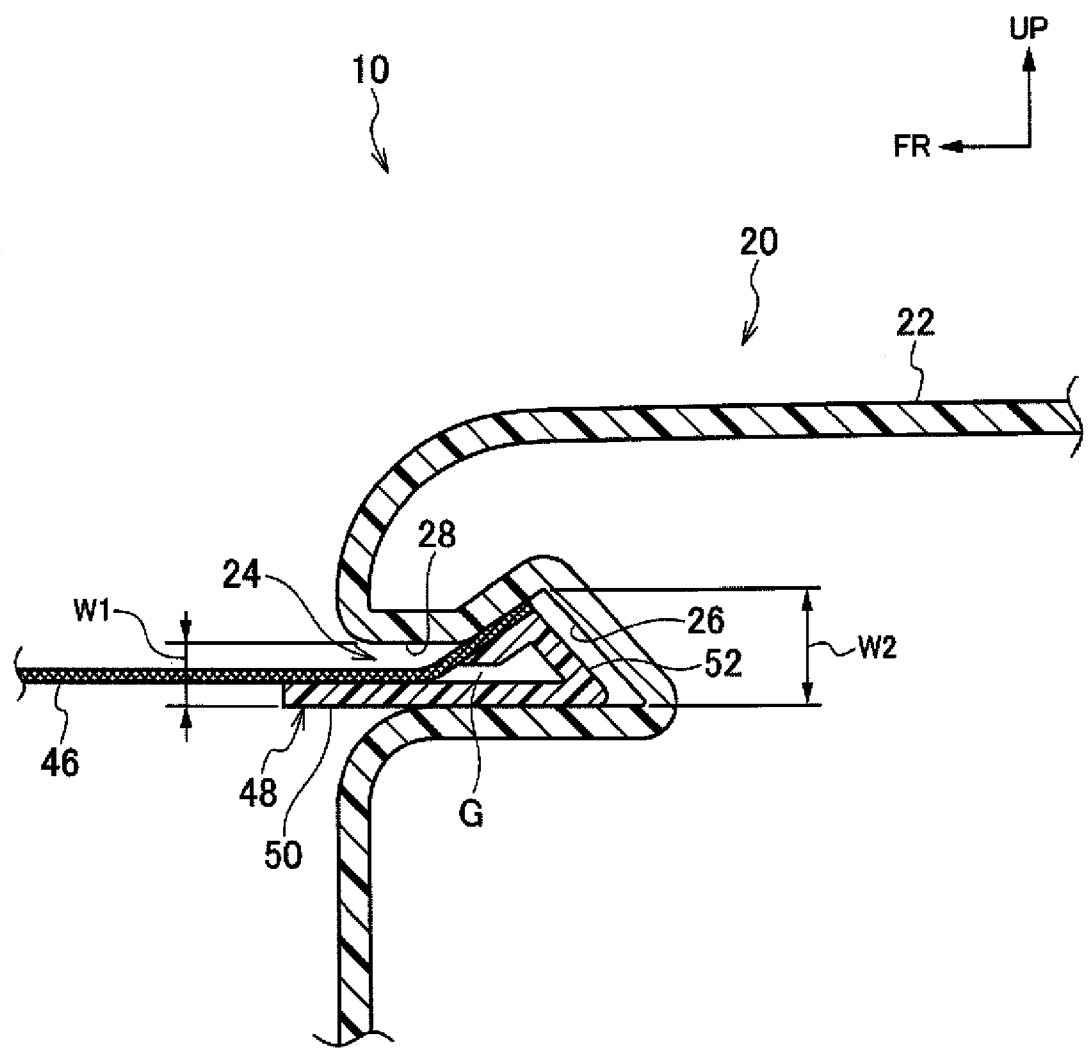
FIG. 5 is a cross-section illustrating a situation in which a claw portion of a hook is engaged in a coupling groove employed in a cover coupling structure shown in FIG. 1, as viewed from the vehicle right hand side.
Figure 6:
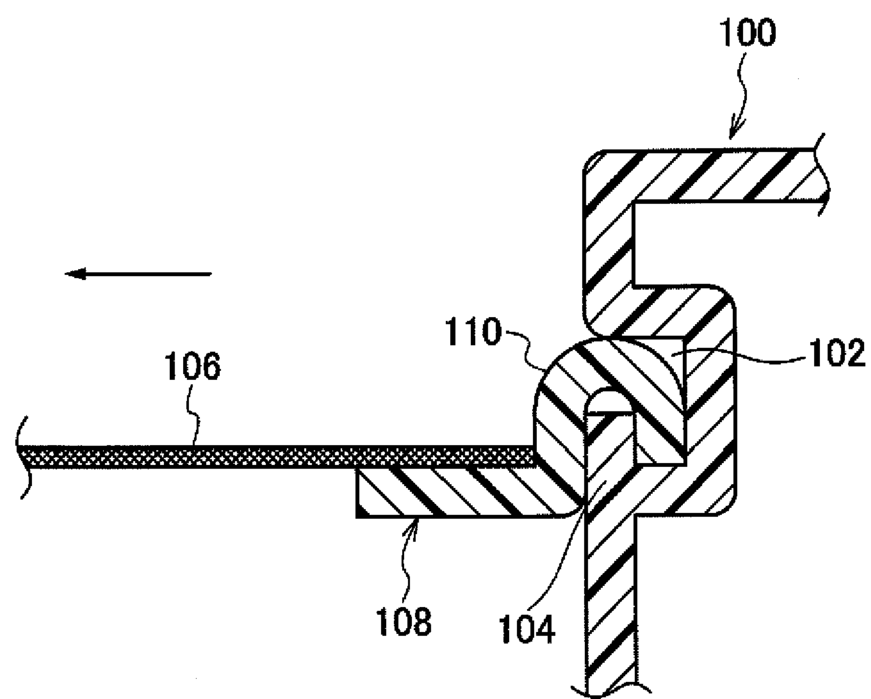
FIG. 6 is a cross-section illustrating a situation in which a hook is engaged with a coupling groove employed in a cover coupling structure of a related art, as seen from the vehicle right hand side.

In the present exemplary embodiment the cross-sectional profile of the engagement groove portion 26 is formed in a substantially circular shape, with the cross-section profile of the claw portion 52 formed in a substantially circular ring shape including the gap however the cross-sectional profiles of the engagement groove portion 26 and the claw portion 52 are not limited thereto. For example, as shown in FIG. 5, configuration may be made such that the cross-sectional profile of the engagement groove portion 26 is a substantially triangular shape, and the cross-sectional profile of the claw portion 52 is a substantially triangular ring shape including the gap 0. Namely, it is sufficient to configure such that the height direction dimension W3 of the resiliently deformable claw portion 52 is set so as to be larger than the height direction dimension W1 of the insertion groove portion 28 when the claw portion 52 has been resiliently deformed.

In the present exemplary embodiment the claw portion 52 of the hook 48 is disposed inside the engagement groove portion 26. The distal end portion of the front cover 46 is also disposed between the outer peripheral portion of the hook 48 and the engagement groove portion 26, with the front cover 46 making contact with the outer peripheral portion of the claw portion 52 and the engagement groove portion 26. However, configuration may be made such that instead, for example, the distal end portion of the front cover 46 is not disposed between the outer peripheral portion of the hook 48 and the engagement groove portion 26, and the outer peripheral portion of the hook 48 makes direct contact with the engagement groove portion 26. Configuration may also be made such that, for example, the front cover 46 makes contact with the outer peripheral portion of the claw portion 52 and the engagement groove portion 26 with the claw portion 52 in a resiliently deformed state. By adopting such an approach rattling about of the claw portion 52 with respect to the engagement groove portion 26 can be efficiently suppressed, and noise can be efficiently suppressed from emanating from between the claw portion 52 and the engagement groove portion 26.

Furthermore, in the present exemplary embodiment the front cover apparatus 40 is attached to the vehicle side walls at the first position and the second position. However, the front cover apparatus 40 may be attached instead to inside the rear seat back 16 of the rear seat 12.

In the present exemplary embodiment, the proximal end portion of the front cover 46 is coupled and fixed to the support shaft 44 of the front cover apparatus 40. However, the proximal end portion of the front cover 46 may instead be coupled and fixed directly to the vehicle rear-side face of the rear seat back 16.

What is claimed is:

1. A cover coupling structure comprising:

a coupling groove that is provided to an elongated shaped tonneau cover apparatus including a tonneau cover for covering a vehicle luggage compartment, the coupling groove comprising a coupling portion coupled to one end of a sheet-form front cover provided between a vehicle seat and the tonneau cover apparatus, and an opening portion that is open to the outer peripheral side of the tonneau cover apparatus and is in communication with the coupling portion and is set with a smaller height dimension than the height dimension of the coupling portion;

an anchor portion provided to the one end of the front cover and coupling the one end of the front cover to the coupling portion by being inserted inside the opening portion and anchoring to the coupling portion; and a resiliently deformable portion that is formed at the anchor portion so as to be resiliently deformable, anchors the anchor portion to the coupling portion by engaging with the coupling portion, and is set with an external profile dimension along a direction orthogonal to a first face of the front cover that is larger than the height dimension of the opening portion when the resiliently deformable portion has been resiliently deformed.

2. The cover coupling structure of claim 1, wherein the resiliently deformable portion is formed by folding back one end portion of the anchor portion such that there is a gap present between the leading end of the resiliently deformable portion and the anchor portion to enable the resiliently deformable portion to resiliently deform.

3. The cover coupling structure of claim 2, wherein the vertical cross-sectional profile of the resiliently deformable portion is formed in a substantially circular ring shape including the gap.

4. The cover coupling structure of claim 1, wherein the one end of the front cover is disposed between the resiliently deformable portion and the coupling portion, and fits into a gap between the resiliently deformable portion and the coupling portion.

5. The cover coupling structure of claim 1, wherein the resiliently deformable portion is engaged with the coupling portion in a resiliently deformed state.

* * * * *